United States Patent
Gochi Garcia

(12) 
(10) Patent No.: US 11,223,607 B2
(45) Date of Patent: Jan. 11, 2022

(54) ENCRYPTED CONTENT WITH DYNAMIC KEY FOR CONTENT ENRICHMENT

(71) Applicant: Telefonaktiebolaget LM Ericsson (publ), Stockholm (SE)

(72) Inventor: Ibon Gochi Garcia, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 82 days.

(21) Appl. No.: 16/617,330

(22) PCT Filed: Jul. 13, 2017

(86) PCT No.: PCT/EP2017/067759
§ 371 (c)(1),
(2) Date: Nov. 26, 2019

(87) PCT Pub. No.: WO2019/011437
PCT Pub. Date: Jan. 17, 2019

(65) Prior Publication Data
US 2020/0153802 A1    May 14, 2020

(51) Int. Cl.
*H04L 29/06* (2006.01)
*H04W 12/033* (2021.01)
*H04W 12/041* (2021.01)

(52) U.S. Cl.
CPC ...... *H04L 63/0442* (2013.01); *H04L 63/0485* (2013.01); *H04L 63/061* (2013.01);
(Continued)

(58) Field of Classification Search
CPC ............ H04L 63/0442; H04L 63/0485; H04L 63/061; H04L 63/062; H04L 63/166;
(Continued)

(56) References Cited

U.S. PATENT DOCUMENTS 5,966,717 A * 10/1999 Sass ................. G06F 16/258
6,948,070 B1 * 9/2005 Ginter ................. G06F 21/10
                                                  348/E5.006
(Continued)

FOREIGN PATENT DOCUMENTS

CA    2437894 A1 * 8/2002 .......... H04L 63/0281

OTHER PUBLICATIONS

"TLS-AUX: Associating Auxiliary Data with TLS Connections", Akamai Technical Paper; Akamai Technologies, Inc., May 2016, pp. 1-16.

*Primary Examiner* — Joseph P Hirl
*Assistant Examiner* — Ka Shan Choy
(74) *Attorney, Agent, or Firm* — Murphy, Bilak & Homiller, PLLC

(57) ABSTRACT

The invention relates to techniques for content encryption with dynamic keys over encrypted protocols (P), like SSL/TLS. The method comprises a step (S41) in which a random key is to automatically and dynamically generated. This generated random key is then asymmetrically encrypted (S42). The enriched variable is encrypted symmetrically (S43) with the generated random key. So far, two intermediate results may be provided, namely a first intermediate result with the encrypted generated random key and a second intermediate result with the encrypted enriched variable. Both intermediate results are then prepared (S44, S45) as custom records. In particular, a first custom record with the encrypted generated random key and a second custom record with the encrypted enriched variable are prepared for injection in a stream of the transport layer protocol (P).

19 Claims, 9 Drawing Sheets

(52) U.S. Cl.
CPC .......... *H04L 63/062* (2013.01); *H04L 63/166* (2013.01); *H04W 12/033* (2021.01); *H04W 12/041* (2021.01)

(58) Field of Classification Search
CPC .......................... H04L 63/045; H04W 12/033; H04W 12/041; H04W 12/02
See application file for complete search history.

(56) References Cited

U.S. PATENT DOCUMENTS

| | | | |
|---|---|---|---|
| 2011/0033050 A1* | 2/2011 | Maller | H04L 9/321 380/259 |
| 2013/0198524 A1* | 8/2013 | Balinsky | H04L 9/0866 713/189 |
| 2013/0318581 A1* | 11/2013 | Counterman | H04L 63/08 726/7 |
| 2015/0271205 A1* | 9/2015 | Duminuco | H04L 63/0281 713/151 |
| 2016/0050124 A1* | 2/2016 | Sanchez Vega | H04W 72/0493 455/452.2 |
| 2016/0094581 A1* | 3/2016 | Kasbekar | H04L 63/0281 713/151 |
| 2016/0191121 A1* | 6/2016 | Bell | H02J 7/00045 307/104 |
| 2016/0359822 A1 | 12/2016 | Rivera | |
| 2017/0085933 A1* | 3/2017 | Czeck, Jr. | H04N 21/26258 |

\* cited by examiner

FIG. 10

| Type | Mayor | Minor | Description |
|------|-------|-------|-------------|
| 0xFF | 0x00 | 0x01 | Encrypted per-flow random key for enriched variable encryption |
| 0xFF | 0x00 | 0x02 | Encrypted per-flow random key validity time |
| 0xFF | 0x00 | 0x03 | Access Network and/or node identification |
| 0xFF | 0x00 | 0x04 | Symmetric encryption algorithm selection |
| 0xFF | 0x00 | 0x00 | Encrypted enriched subscriber or Access Network variables |

…

ENCRYPTED CONTENT WITH DYNAMIC KEY FOR CONTENT ENRICHMENT

TECHNICAL FIELD

The present application generally relates to the field of enriching content in traffic of subscriber networks in a secure manner. In particular, a technique is presented which may be used in 3GPP access networks.

BACKGROUND

In data networks, like for example, in 3GPP access networks, content enrichment allows for the inclusion (enrichment) of subscriber and/or network variables in subscriber traffic—so that this information provided by an access network can be used in content providers (also called Over the Top Content Providers or OTTs) to implement multitude of use cases, some of them being single sign-on, two factor authentication or subscriber tracking. Besides the subscriber or client, two nodes are involved in the enrichment: First an enricher, which is responsible for the enrichment process, for instance, a PCEF (a node with policy control enforcement function, for example a gateway or similar) or a TDF in the Access Network and second a receiver, who will receive and optionally process the received enriched content, for example an OTT server (Content Provider).

Due to the attacks on several internet technology systems, concerns arise in favor of more and improved security. One approach is that all the web traffic should be secured with an end-to-end technology (like TLS) that provides encryption, server authentication, and integrity. This approach, however, leads to further restrictions, inter alia for network operators, who often use intermediate proxies for various services such as transparent caching, transcoding/trans-rating, real-time network intelligence sharing, etc.

In prior art content enrichment may be based on unencrypted protocols like HTTP, IMAP or POP3. When using unencrypted protocols, the enriched content needs to be secured. For this reason, in prior art it was necessary to configure and share a key (pre-shared key, PSK) between the nodes being involved, namely between the enricher and the receiver. Any symmetric key algorithm (RC4, AES or similar) can be used in this use case. This encryption algorithm also has to be agreed between the parties before the enrichment is implemented, along with the pre-shared key, PSK.

In prior art, encrypted protocols for transport of content like SSL and TLS are defined. SSL and TLS are two transport layer encryption protocols that are popular to encapsulate HTTP traffic—or any other type of traffic. Both SSL and TLS start with a handshake phase following the establishment of a TCP connection (TCP Handshake). After the SSL/TLS handshake phase is concluded both the client in the user equipment (UE) and the server in the OTT share an "Encryption Context" will all keying material needed to exchange information securely between the said client and server. The data exchange phase (encrypted with the "Encryption Context" negotiated during the handshake) is referred as Record Protocol phase.

In prior art, mechanisms such as TLS-AUX are known to allow for the injection of custom records to the SSL/TLS stream (during the Record Protocol phase) with subscriber and network variables. It is important to mention that in SSL/TLS enrichment there is no relationship between the "Encryption Context" negotiated between the UE and the OTT server during the handshake phase and the symmetric algorithms and keys used to encrypt the enriched variables by the Access Network (pre-shared key, PSK). Keys and algorithms can be different, as the "Encryption Context" is securely negotiated between the UE and the OTT using the SSL/TLS mechanisms and the PSK encryption of enriched variables is done between the enricher (e.g. PCEF/TDF in the Access Network) and the receiver (e.g. OTT server).

Therefore, in the prior art, there is clear distinction between the asymmetric encryption provided by SSL/TLS that applies to the traffic exchanged between the endpoints and the symmetric encryption (pre-shared key) used to encrypt the variables enriched by the network and sent to the OTT server.

Prior art content enrichment has two main drawbacks: First the need for prior key distribution (PSK) and second the need for manual selection of an encryption algorithm.

1. Key Distribution:

PSK based content enrichment requires of an offline agreement of the key to be used for the encryption of variables between the enricher and the receiver. The offline agreement of keys can be done via email, phone call or any other manual or semiautomatic mechanisms, and it requires for the keys to be manually configured on both the Access Network function (PCEF or TDF) and the OTT server (or UEs if the enrichment is towards the terminals). Manual configuration has numerous problems, such as human errors in the introduction of the keys. Also, if multiple PCEFs or TDFs or multiple OTT servers must be configured the key should be introduced in all of them. A pre-shared key is a weak mechanism to ensure privacy, as compromising a pre-shared key (key being leaked to malicious parties) will jeopardize the security of the solution. To mitigate this problem pre-shared keys should be rotated, updated, or changed frequently. The manual operations described above to update a pre-shared key make this task tedious and error prone—for instance an incorrect key is configured in one of the PCEFs or TDFs. These potential errors introduce the need for testing, to check that the keys are properly updated, introducing costs in the solution and increasing the lead time in new or existing deployments. Finally, the time it takes to update a key across all the elements in the solution is relevant, as if some nodes are updated first the use case (Content Enrichment) will be broken until the rest of the nodes are also updated to use the new key. Therefore, the key rotation required to secure pre-shared key scenarios will temporarily break the use case until all the elements in the solution are synchronized (all the PCEFs in the Access Network and all the servers in the OTT in the default embodiment of the solution). The fact that in the telecoms space the Access Network and the OTT server are controlled by different companies just exacerbates the problem. In practice, these drawbacks make the update of pre-shared keys not feasible and solutions using PSK tend never to change the pre-shared keys—introducing a security risk.

2. Algorithm Selection:

Similarly, elements using PSK for Content Enrichment in prior art must also synchronize which algorithm to use—that is, both elements of the communication must agree on the algorithm to be used for the encryption. Changing this agreement will require, as above, of synchronization and it can result in misalignments and failures in the implementation of the use case. Algorithm selection can be seen a similar problem to key distribution—although algorithm selection change is generally not required once the use case has been implemented and verified.

SUMMARY

There is a need for an improved technique for content enrichment in a subscriber network. In particular, security should be improved by making sure, that enriched content is always only communicated in a secure manner and not in the clear. Moreover, the procedure for a secure data exchange should be simplified by removing the need for pre-shared key exchange. Finally, operating costs should be minimized.

The invention is embodied in independent claims. Advantageous embodiments are described in the dependent claims.

According to a first aspect of the invention, the need, mentioned above, is satisfied by a method for preparing an enriched variable, like for example a network variable (e.g. MSISDN, IMSI, ULI) for secure transfer via a transport layer protocol (in particular SSL/TLS as an encrypted protocol but also via unencrypted protocols like HTTP, POP3, IMAP) with subscriber payload data. The method comprises a step in which a random key is to automatically and dynamically generated. This generated random key is then asymmetrically encrypted. The enriched variable is encrypted symmetrically with the generated random key. So far, two intermediate results may be provided, namely a first intermediate result with the encrypted generated random key and a second intermediate result with the encrypted enriched variable. Both intermediate results are then prepared as custom records. In particular, a first custom record with the encrypted generated random key and a second custom record with the encrypted enriched variable are prepared for injection in a stream of the transport layer protocol. They method mentioned above may be executed on an enricher.

In a preferred embodiment, the asymmetric encryption (with the key which was extracted via DPI inspection of SSL/TLS handshake) of the generated random key is used to secure a key transfer between the enricher and the receiver, i.e. the exchange of the random symmetric encryption key.

In a preferred more specific embodiment a SSL/TLS protocol data exchange between an enricher and a receiver which acts as server is used, in which the enricher inspects a SSL/TLS handshake, extracts a server certificate from that handshake data exchange, which contains the server public key, and uses the server public key to encrypt the random encryption key. It is preferred, to use the certificate, that is meant for a client device to encrypt the SSL/TLS session, as a new way to convey the random symmetric encryption key securely to the server. By encrypting the symmetric random key in the enricher with the public key in the certificate (obtained e.g. via DPI), only the server can decrypt that random symmetric encryption key as only the server will have the private key associated with the public key and the certificate. It has to be mentioned that the terms "server" or "OTT server" have to be construed in the sense of "receiver", which is interacting with the enricher. In this advantageous embodiment, the public key of the receiver is obtained, in the case of SSL/TLS traffic, from the server certificate negotiated during the SSL/TLS handshake.

If other protocols are used that do not exchange a certificate (like HTTP, POP, IMAP) it is preferred to use the certificate from other SSL/TLS flows for the same server/receiver. For example, if a certificate for a particular server A from a SSL/TLS flow is known, then the invention suggests to use that certificate to exchange a key that will be used for HTTP traffic that goes to the same server (server A).

According to a first preferred embodiment of the present invention, the method may additionally include another step of dynamically determining the symmetric encryption algorithm to be used for encrypting the enriched variables. This has the technical advantage that security may be further improved by using different algorithms, which makes attacks more difficult.

According to a first preferred embodiment of the present invention, the first and second custom record are identical. This has the technical advantage that the random key and the enriched content may be transferred in parallel and even at the same time. This saves processing time and helps to provide the result with processed enriched content earlier. It is no longer necessary to exchange keys between the nodes prior to enriching content.

According to another preferred embodiment of the present invention, the random key is dynamically generated per subscriber session and in particular per flow (a flow is an IP 5-tuple including the source and destination IP addresses, transport level ports and transport protocol) for a specific subscriber. This feature shows the technical advantage that security may be improved by using different random keys for different subscriber sessions or even for different flows of a subscriber. For further saving processing resources it is possible that the key generation is initiated (only) if traffic is detected automatically, in particular with deep packet inspection techniques (DPI).

According to another preferred embodiment of the present invention, the first or second custom record comprises an indication of a symmetric encryption algorithm which is determined dynamically and which is to be used for the encryption of the enriched variable. This aspect helps to further improve the security level, because the encryption algorithm may be changed frequently and dynamically and may thus differ from subscriber session to session. Alternatively, it is possible that enricher and receiver may agree upon an algorithm to be used. Then, the indication of the symmetric encryption algorithm may be omitted and transfer may be skipped. For instance, SSL/TLS records with type 0xFF and mayor 0x00 and minor 0x00 can be used to carry the encrypted enriched variable and SSL/TLS records with type 0xFF and mayor 0x00 and minor 0x01 can be used to carry the generated symmetric random key.

According to another preferred embodiment of the present invention, the first or second custom record comprises a validity time segment. The validity time segment represents an indication how long the random key will be valid. This also helps to manage the keys and to increase security in that keys may only be used in a pre-defined time interval and not longer. The time during which the random key will be valid can be conveyed via a custom SSL/TLS Record (if not embedded in the key format). Validity times can be used to age the keys, allowing for key update and rotation—increasing in this way the security of the solution. For instance, SSL/TLS records with type 0xFF and mayor 0x00 and a pre-defined minor (e.g. minor 0x02) can be used for identifying the respective information to be extracted from the transferred data. Accordingly, this type of SSL/TLS records may also be used for identifying the other custom records, like the record containing the encrypted enriched variable, the record containing the symmetric random key, the record containing the symmetric algorithm used for encrypting the enriched variable and other records like a record to identify the access network/access provider to the OTT server.

The custom records may include the first and second custom record as mentioned above and a record containing the symmetric algorithm used for encrypting the enriched variable and other records like a record to identify the access network/access provider to the receiver, in particular the OTT server.

According to another preferred embodiment of the present invention, the first or second custom record comprises an identification segment for identifying PLMNId or Network Identification for troubleshooting. PLMN Identification (PLMN ID, public land mobile network ID) or Network identification (MCC/MNC) and node identification: for troubleshooting purposes. A PLMN is identified by the Mobile Country Code (MCC) and the Mobile Network Code (MNC). The Access Network can identify itself towards the receiver (e.g. OTT server), in case for instance the key format changes unexpectedly or there is any other problem like a node incorrectly configured. In this way, the OTT server can identify the faulty network or node and proceed to discuss the situation with the Access Network administrators. For instance, type 0xFF and mayor 0x00 and minor 0x03 can be used for this purpose. This aspect has the technical advantage of an improved error detection and automatic processing.

According to another preferred embodiment of the present invention, the random key is asymmetrically encrypted with the receiver's private key according to the transport layer protocol. The latter may be the SSL/TLS protocol and, in particular, a TLS handshake protocol.

According to another preferred embodiment of the present invention, the first or second custom record is injected in the stream of the transport layer protocol (e.g. SSL/TLS) by a TLS-AUX mechanism or any other similar mechanisms to inject custom records into a SSL/TLS record stream. TLS-AUX is a mechanism for in-band metadata communication for use with end-to-end encrypted traffic flows. It does not interfere with encryption in any way. It has the advantage that no new infrastructure is necessary, which helps to reduce operational network costs.

According to another preferred embodiment of the present invention, the transport layer protocol is an encrypted protocol, e.g. SSL/TLS. In another embodiment, the transport layer protocol may also be an unencrypted protocol and may for example be a HTTP, POP3 or IMAP protocol.

In another aspect, the invention relates to an enricher which is adapted for preparing an enriched variable for secure transfer via a transport layer protocol with subscriber payload data. The enricher comprises a key generation unit for automatically and dynamically generating a random key. It further comprises a first encryption unit for asymmetrically encrypting the generated random key and a second encryption unit for symmetrically encrypting the enriched variable with the generated random key. The enricher consists of an injection unit for preparing a first custom record with the encrypted generated random key and preparing a second custom record with the encrypted enriched variable for injection in a stream of the transport layer protocol.

According to a preferred embodiment the enricher further comprises a sending unit for sending the stream with the injected custom records to a receiver. However, in other embodiments, the sending unit may be externalized and may be located remote from the enricher as a separate additional node or computing unit.

According to a preferred embodiment the enricher is located in an access network node for example as gateway and in particular is implemented in a policy control enforcement node (PCEF) or a traffic detection node (TDF).

Moreover, a receiving method for receiving and extracting a secured enriched variable, which was received via a transport layer protocol with subscriber payload data is disclosed. In a first step, the receiving method executes: receiving a first custom record with an encrypted generated random key and receiving a second custom record with an encrypted enriched variable. Of course, the sequence of steps may be amended according to the specific implementation. After having received the first and second custom record, the encrypted random key is extracted. This extracted encrypted random key is then decrypted. Afterwards, the random key is used to decrypt the received encrypted enriched variable.

According to a preferred embodiment the receiving method is implemented in a server, in particular, in an over the top content provider (OTT) or is implemented on a client device on a subscriber side.

According to the receiving method, a receiver is disclosed, which is adapted for receiving and extracting a secured enriched variable which was received via a transport layer protocol with subscriber payload data. The receiver comprises an input unit, which is adapted for receiving a first custom record with an encrypted generated random key and which is further adapted for receiving a second custom record with an encrypted enriched variable. The receiver consists of an extraction unit for extracting the encrypted random key. The receiver also consists of a decryption unit for decrypting the extracted encrypted random key and of a dissolver (which may be a processor), which is adapted for using the random key to decrypt the received encrypted enriched variable.

Moreover, a network system is disclosed, comprising an enricher as mentioned above and a receiver as mentioned above.

The present invention further relates to a method for secured transfer of enriched variables via a transport layer protocol with subscriber payload data, wherein a random key is generated on the side of the enrichment, in particular, on the enricher itself, automatically and dynamically. The generated random key is asymmetrically encrypted on the side of the enrichment. The enriched variable with the generated random key is symmetrically encrypted on the side of the enrichment. Two intermediate results may then be provided on the enricher, namely a first intermediate result with the encrypted generated random key and a second intermediate result with the encrypted enriched variable. Based on the two intermediate results, a first custom record with the encrypted generated random key and preparing a second custom record with the encrypted enriched variable for injection in a stream of the transport layer protocol may be prepared and provided for transfer on the enricher.

The method continues on the receiving side with receiving the first custom record with an encrypted generated random key and receiving a second custom record with an encrypted enriched variable. On the side of the receiver, the encrypted random key is extracted and decrypted and then may be used to decrypt the received encrypted enriched variable on the receiver. The enriched variable may then be processed.

The invention is furthermore embodied in a computer program loadable into a processing unit of an access network function node, the computer program comprising code adapted to perform the steps of a method for preparing an enriched variable described above when processed by the processing unit.

The invention is furthermore embodied in a computer program loadable into a processing unit of a server or at a client device, the computer program comprising code adapted to perform the steps of a receiving method, mentioned above, when processed by the processing unit.

Finally, the invention is furthermore embodied in a computer program loadable into a processing unit of an access network function node and/or a server and/or a client device, the computer program comprising code adapted to perform the steps of a method for secured transfer of enriched variables, as described above when processed by the processing unit.

The processing units may be implemented in an access network node, for example on a gateway (PCEF, TDF), on the receiver (a server, e.g. OTT server) or on a client device. The processing units may be implemented as physical or virtual appliances.

The solution presented above presents an efficient mechanism to solve the key distribution and algorithm selection problems existing in the prior art of content enrichment with encrypted subscriber or network variables—with the enrichment done in both clear-text or encrypted transport protocols.

The default embodiment of this invention, that of enriching SSL/TLS subscriber data plane traffic with encrypted access network variables using a dynamically negotiated keys allows for full end-to-end security of the subscriber traffic and of the enriched content and increases ease of maintenance as the key distribution and algorithm selection can be automated, improving security—via frequent key rotations—and minimizing operating costs—due to automatization.

The invention also uses a double key setup (with an asymmetric session key and a symmetric one-time use key) to improve performance while at the same time delivering sufficient protection. Thus, the key distribution problem is solved, allowing for the frequent changes of keys between the elements of the solution without the need for out of band communication or selection of keys and also, without the need for manual configuration of nodes as the solution is automatic.

The solution, presented here, provides encryption for enriched variables, allowing for sensitive subscriber or network information to travel between the access network and the OTTs (also between the Access Network and the UE if enrichment towards the subscriber side is used) without being disclosed to third parties (prevents external inspection). Also, encryption allows for the preservation of integrity, meaning that any modification of the variables made by third parties can be detected and discarded—thus preventing external manipulation and man in the middle (MITM) attacks.

Equally to the above, the solution also addresses the algorithm selection problem, allowing not to require manual intervention if the encryption algorithm is to be changed (due to for instance a bug being found in the design of the algorithm that can compromise the security or if for instance there is a need to increase the key length used by the algorithm thus improving security).

Finally, the invention provides an efficient implementation, with reuse of any asymmetric encryption used in key negotiation (asymmetric encryption is computationally expensive) and relying on symmetric encryption with dynamically negotiated keys for performance.

BRIEF DESCRIPTION OF THE DRAWINGS

In the following, the invention will further be described with reference to exemplary embodiments illustrated in the figures, in which:

FIG. 10 shows a table with example records which may be transferred as enriched content according to an embodiment of the invention.

DETAILED DESCRIPTION

Figure 1:
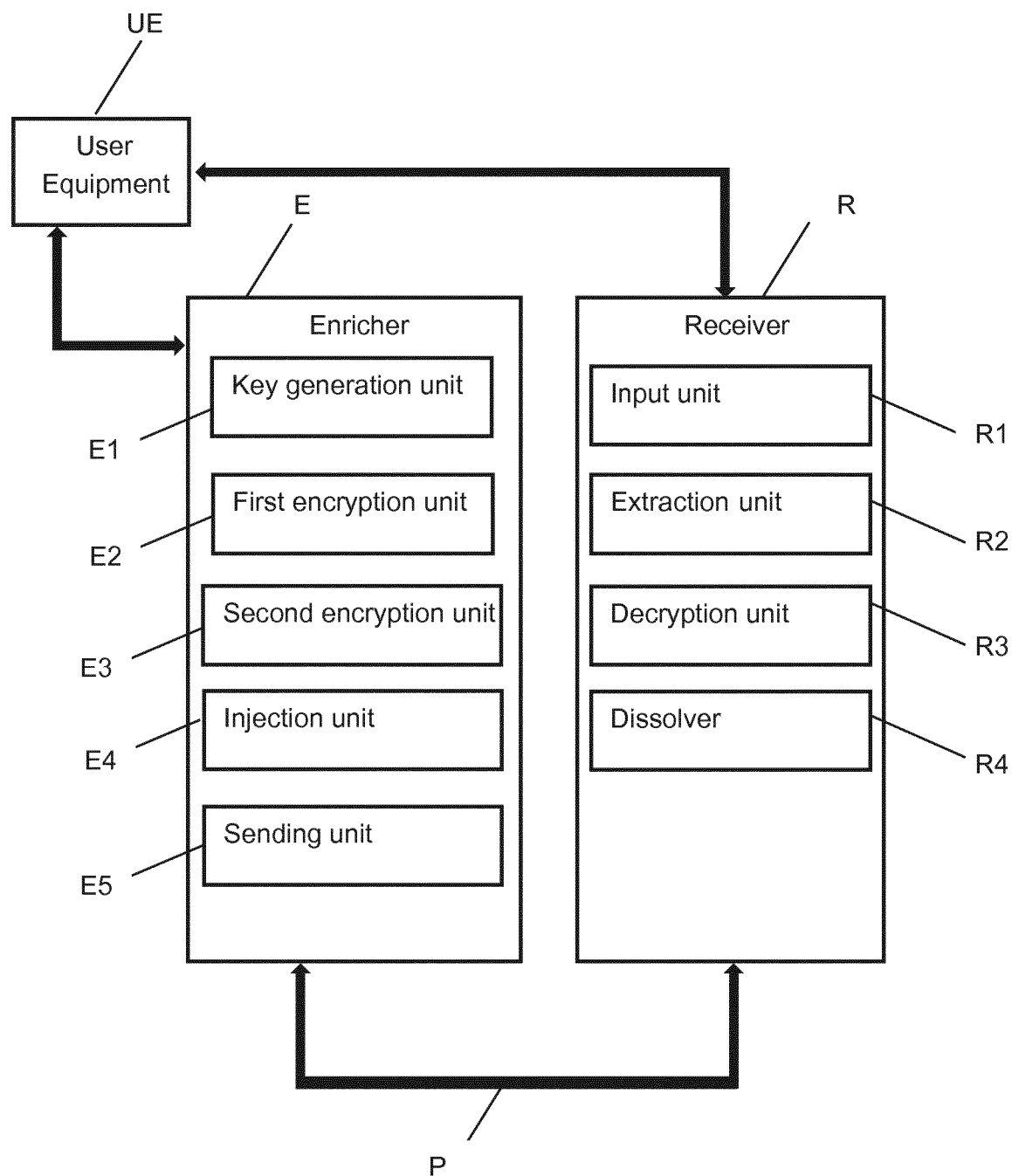
FIG. 1 schematically illustrates an embodiment of the present invention showing the interacting nodes.

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled person will appreciate that the current invention may be practiced with any wireless network like for example UMTS, GSM or LTE networks. As another example, the invention may also be implemented in wireline networks, for example in any IP-based networks. Further the invention is applicable for implementing in any data center deploying an enricher or a receiver. The invention may also be used in a cloud computing network. In the following detailed description, the examples mainly refer to the embodiment, in which the enrichment is done from the access network 100 towards the receiver R (for example OTT server on the Internet). However, the proposal suggested in this application also applies as well if the enrichment is done from the access network 100 towards the client UE on the subscriber side.

The present invention proposes a robust mechanism for the encryption of enriched variables over both encrypted (e.g. SSL/TLS) and unencrypted transport layer protocols (e.g. HTTP, POP3, IMAP) without the need to pre-share keying material or algorithms between the interacting nodes client device UE, enricher E and receiver R.

Also, the solution uses a double key mechanism, with a master key negotiated using asymmetric encryption (increased security) and a one-time use session key using symmetric encryption (increased performance). The invention addresses the problem how to securely distribute the random key without pre-arrangements or pre-shared-keys.

The invention provides a mechanism for the generation of random keys to be used for content enrichment. It further provides a mechanism for the distribution of these random keys between the (physical or virtual) network nodes enricher E (typically PCEF or TDF) and receiver R (typically OTT server) but also to the user equipment UE if the enrichment is done towards the subscriber side. Moreover, it provides a mechanism for the negotiation and selection of the encryption algorithm to be used to secure the enriched variables and a mechanism to optimize the generation of random keys necessary for the purposes of Content Enrichment.

Usage of all the mechanisms above would allow for the implementation of content enrichment with dynamic keys, and with subscriber and network variables encrypted.

The preferred embodiment of the invention will use SSL/TLS as the transport layer protocol to convey the enrichment, although it could also be applied to other protocols if the necessary conditions are met.

In the following a definition of terms used with this application is given.

The enricher E is a computing entity, for example a processor and may be implemented in a network node, in particular in an access network node, for example in a gateway. In a preferred embodiment, the enricher E may be implemented in a policy control enforcement node PCEF or a traffic detection node TDF. The enricher E is adapted to execute the enrichment.

The receiver R also is computing entity, for example a processor and may be implemented in a network node, in particular in a server, for example a content provider, in particular an over the top content provider OTT. The receiver R is adapted to execute the receiving function.

The entities E, UE, R use a data network. In a preferred embodiment, an IP-based access network, in particular a 3GPP access network will be used such as GPRS or EDGE for connecting to the network. The network is a cellular network or a mobile network, where the last link is wireless. The network may be deployed as GSM, UMTS or LTE network.

The transport layer protocol P is a protocol used for subscriber user plane traffic. In a first embodiment, this may be an encrypted protocol, for example SSL/TLS. In a second embodiment, an unencrypted protocol may be used, like HTTP, IMAP or POP3.

The enriched variable is to be construe as digital content, which should be provided additionally to the (usual) subscriber traffic. For example, in 3GPP access networks, MSISDN, IMSI, ULI and/or others may serve as enriched variable. MSISDN is a number uniquely identifying a subscription in a GSM or a UMTS mobile network. It may refer to the mapping of the telephone number to the SIM card in a mobile/cellular phone. MSISDN may stand for "Mobile Station International Subscriber Directory Number". The MSISDN follows the numbering plan defined in the ITU-T recommendation E.164. The IMSI (International Mobile Subscriber Identity) is used to identify the user of a cellular network and is a unique identification associated with all cellular networks. It is stored as a 64 bit field and is sent by the phone to the network. It is also used for acquiring other details of the mobile in the home location register (HLR) or as locally copied in the visitor location register. To prevent eavesdroppers identifying and tracking the subscriber on the radio interface, the IMSI is sent as rarely as possible and a randomly generated TMSI is sent instead. The IMSI is used in any mobile network that interconnects with other networks. For GSM, UMTS and LTE network, this number is provisioned in the SIM card and for CDMA2000 in the phone directly or in the R-UIM card (the CDMA2000 analogue to a SIM card for GSM). The MSISDN together with IMSI are two important numbers used for identifying a mobile subscriber. The IMSI is stored in the SIM card.

The random key is generated automatically and dynamically. Preferably, the random key is a symmetric random key. This has the technical advantage that the process is implementable more efficiently (better performance). The random key generation may preferably be automatically triggered if user traffic is detected. For this purpose and according to a preferred embodiment of the invention, deep packet inspection techniques DPI may be applied. The term "dynamically" refers to the fact that the random key is generated a new for each transfer. In a first embodiment, the random key is generated for each flow, according to a second embodiment, it is generated for each session, so that a random key may be shared by multiple flows. A flow may comprise of all the traffic pertaining to the same 5-tuple or flow (that is, traffic sharing the same source and destination IP addresses, transport level ports and transport protocol) carrying SSL/TLS. A session, thus, comprises all 5-tuples of the same subscriber or even all 5-tuples of the same subscriber for a particular destination (OTT server). A session may be a IPCAN or PDN or a service session. In a preferred embodiment, the random key is generated on the enricher E for each flow. A new random key only applies to a flow and all variables in that flow are enriched using that random key. But in another embodiment, the random key is only exchanged for the first flow for a subscriber and will be re-used for the rest of the flows of the same subscriber. The end term for usage of that random key may be defined in a validity time segment, defining, how long the respective random key may be used, for example, once a day for a subscriber.

A custom record refers to a segment in a record to be transferred, in particular a SSL/TLS record. The SSL/TLS records will be mapped to TCP segments on a lower hierarchy level (not necessarily a one-by-one mapping). The custom record will be injected in the stream of the transport layer protocol P. The TLS protocol operates on top of TCP/IP and consists of the exchange of messages between the client US and the receiver R (which will e.g. be a server). A TLS record has a 5-byte header, specifying the type of the record, TLS protocol and the length of the record.

An overview is given in FIG. 1, which shows the involved nodes as computing entities, which are active for transfer of encrypted content which is encrypted with an automatically and dynamically generated random key.

A client UE interacts with an enricher E, which may be implemented as gateway and with a receiver R, which may be implemented as server, for example as OTT server. The enricher E and the receiver R are communicating via a transport layer protocol P.

The enricher E comprises a key generation unit E1 for automatic and dynamic generation of random key, a first encryption unit E2 for asymmetrically encrypting the generated random key, a second encryption unit E3 for symmetrically encrypting the enriched variable with the generated random key, an injection unit E4 for preparing a first custom record with the encrypted generated random key and preparing a second custom record with the encrypted enriched variable for injection in a stream of the transport layer protocol P, which may be the SSL/TLS protocol. The enricher may optionally consist of a sending unit E5 which is adapted for sending the stream with the injected custom record to the receiver R. The second encryption unit E3 is an electronic module (as the other units are) which comprises the DPI module, which is required to extract the server (i.e. receiver) certificate from the SSL/TLS negotiation—and from the server certificate the server public key.

The random symmetric encryption key is to be encrypted with that server public key and sent to the receiver R (server). In this way, only the receiver R/server will be able to decrypt that information and extract the random symmetric encryption key as only the receiver R/server has the receiver R/server private key.

The receiver R comprises an input unit R1 which is adapted for receiving a first custom record with an encrypted generated random key and which is further adapted for receiving a second custom record with an encrypted enriched variable. The receiver R further consist of an extraction unit R2 for extracting the encrypted random key and of a decryption unit R3 for decrypting the extracted encrypted random key, wherein the decryption is executed with the receiver's private key. Moreover, a dissolver R4 is provided which is adapted for using the random key to decrypt the received encrypted enriched variable.

Figure 2:
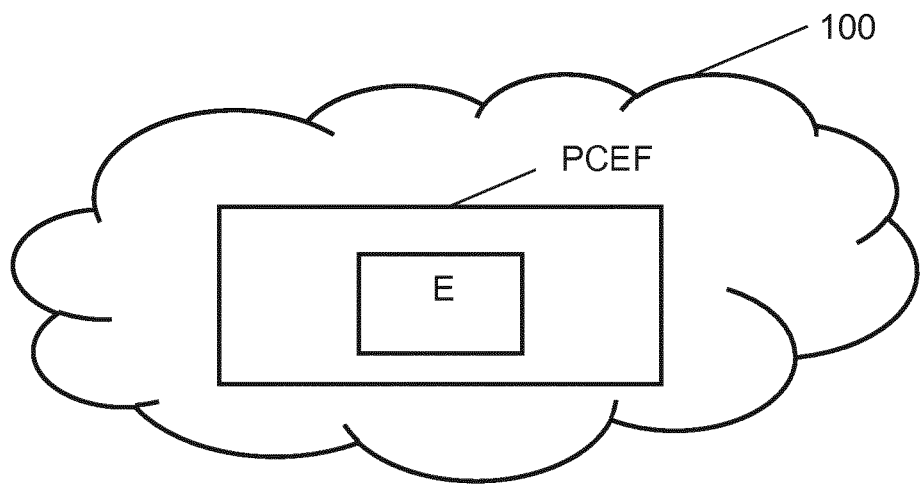
FIG. 2 shows an embodiment of an enricher.

FIG. 2 shows one embodiment where the enricher E is deployed in a PCDF node in the access network 100.

Figure 3:
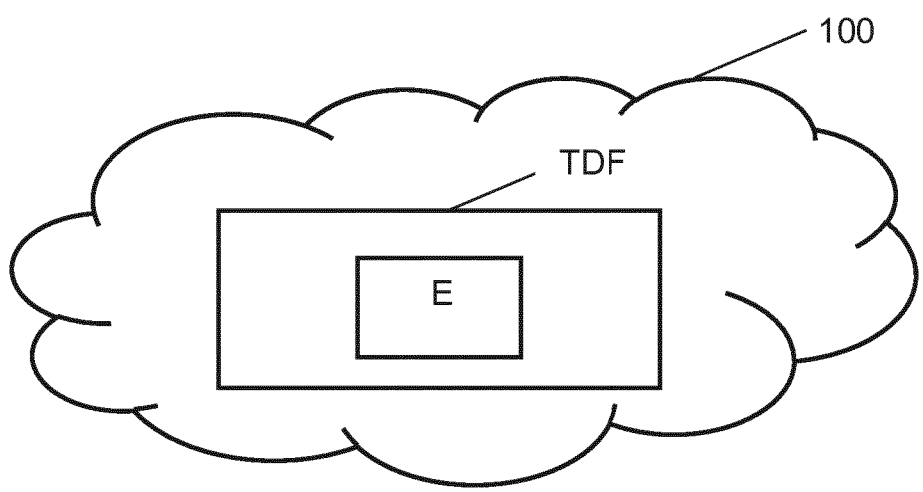
FIG. 3 shows an embodiment of an enricher

FIG. 3 shows another embodiment where the enricher E is deployed in a TDF node in the access network 100.

Figure 4:
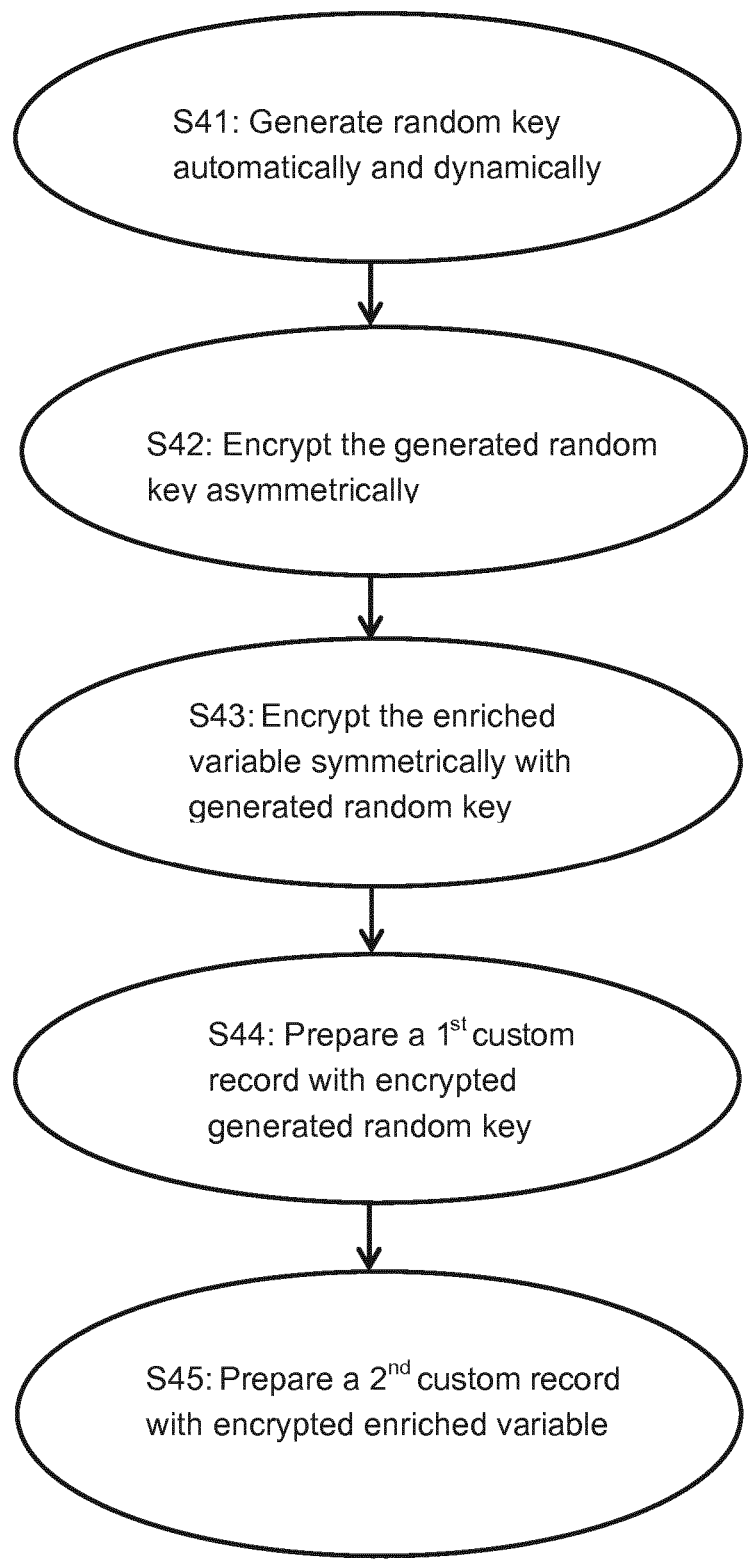
FIG. 4 shows an embodiment of a receiver.

FIG. 4 is a flow chart for an enriching method, i.e. for the method which is to be executed on the enricher E. After starting the method, in step S41 the random key is generated automatically and dynamically per flow or per session. In step S42 the generated random key is encrypted asymmetrically, in particular with the public key of the receiver R. In step S43 the enriched variable is encrypted with the generated random key. The encryption is a symmetric encryption. In step S44 a first custom record is prepared with the generated random key. In step S45 a second custom record is prepared with the encrypted enriched variable. Usually, the method may—in addition—comprise a further step (not shown in FIG. 4), namely for sending the prepared custom records to via SSL/TLS protocol P to the receiver R. After that the method may end or may be executed again iteratively.

Figure 5:
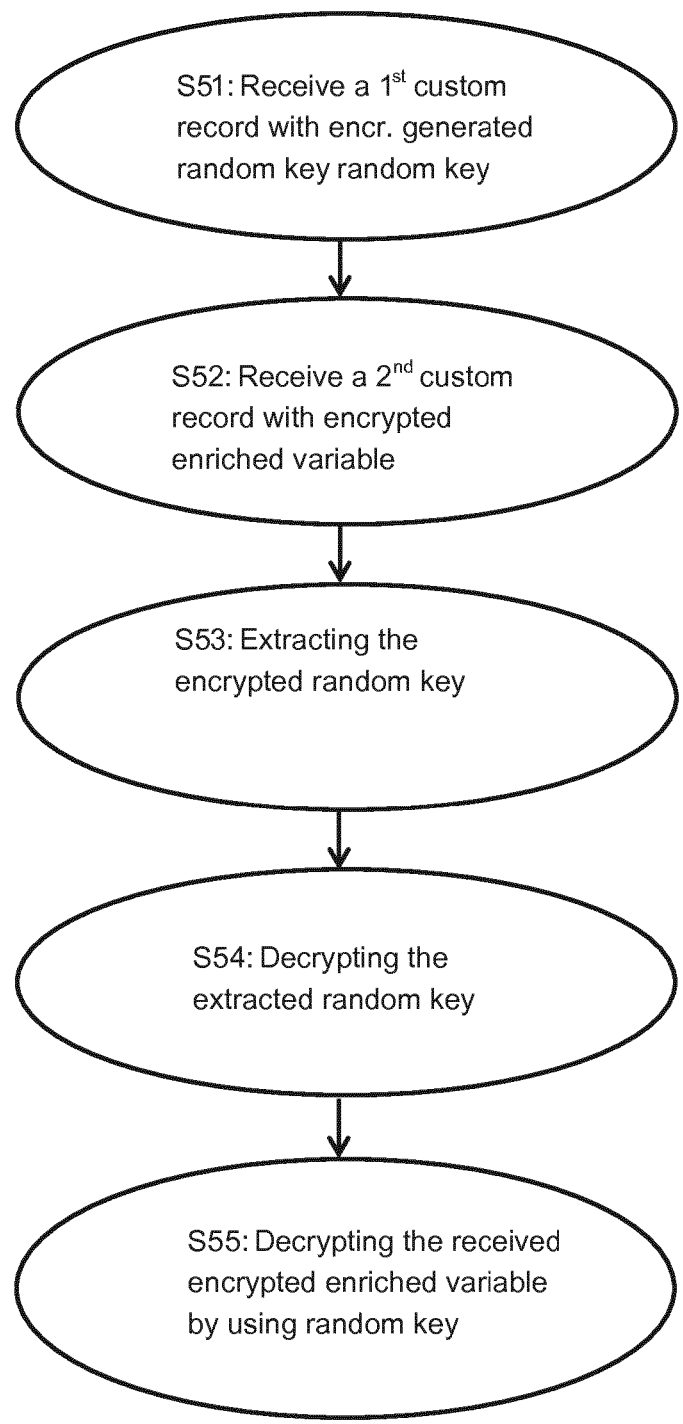
FIG. 5 is a flow chart of an enriching method according to an embodiment of the invention.

FIG. 5 depicts a flow chart for a receiving method, which is to be executed on the receiver R. In step S51 the first custom record is received on the receiver R. In step S52 the second custom record is received on the receiver R. In step S53 the encrypted random key is extracted and is decrypted in step S54. In step S55 the received encrypted variable is decrypted by using the random key. After this step, the enriched content or variable is available on the side of the receiver R for further processing. After this the method may end or may continue for further flows or sessions.

Figure 6:
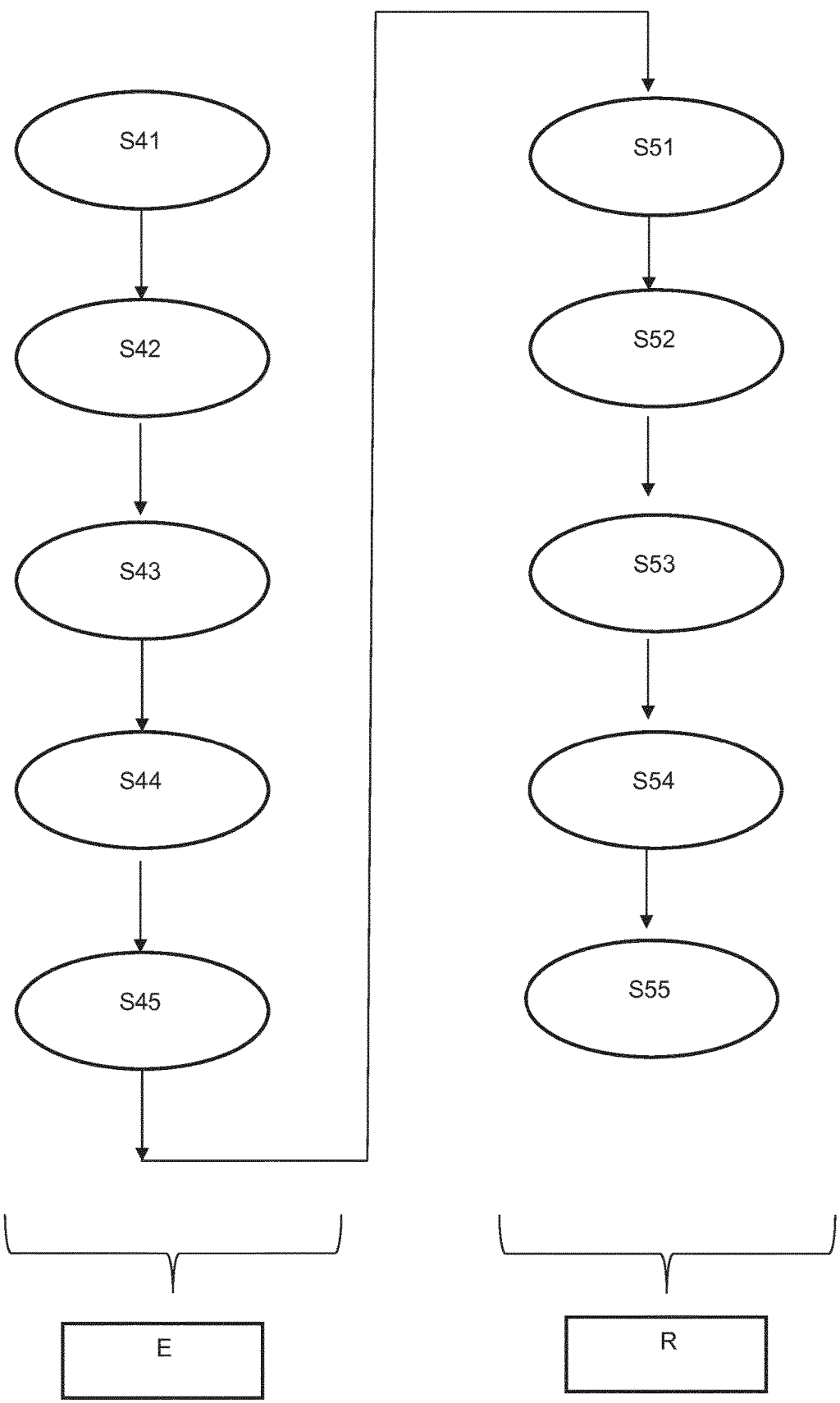
FIG. 6 is a flow chart of an enriching method according to an embodiment of the invention.

FIG. 6 shows a method which may be executed in the access network 100 in a distributed manner, i.e. in a system and on an enricher side and a receiver side as well. The steps mentioned before with respect to FIG. 4, namely steps S41, S42, S43, S44 and S45 are executed on the enricher E and the steps mentioned above with respect to FIG. 5, namely S51, S52, S53, S54 and S55 are executed on the receiver R. The system comprises the enricher E and the receiver R as well.

For summarizing, the solution provided within this application has three key features:

Using a server certificate (i.e. certificate of the receiver R) on the enricher E (PCEF/TDF) to extract the server public key that will be used to convey the random key securely to the server. The server certificate is provided by inspection from the SSL/TLS handshake.

A random key is generated by the function doing the enrichment on the enricher E and—optionally, but preferred—an encryption algorithm is chosen (for example, PCEF).

The information above (random key and preferably the selected algorithm) is securely conveyed to the function receiving the enriched information, namely the receiver R (for example, the OTT server).

Variables enriched are encrypted with the random key generated and algorithm dynamically chosen.

In the following, mechanism for the generation of random keys to be used for content enrichment will be described in more detail.

The generation of random keys is automatically triggered, when traffic from the subscriber to the OTT (in the default embodiment that enriches towards the OTT) is detected in the enricher E (PCEF or TDF) via for instance Deep Packet Inspection (DPI) techniques.

The keys generated should contain at least the following elements:

A known string identifying the format of the key (in this example "KEY").

A random number unique at least per OTT server (as preferred deployment of the receiver R).

A timestamp.

Other elements can also be used for the generation of the random key, like an access network identification, or a node identification.

It is not recommended to append subscriber identification as this would render the key invalid for multiple subscribers in the same node and this invention recommends sharing keys per OTT within the same node implementation. This is in any case a recommendation for performance purposes and not a limitation.

For instance, the following structure can be followed when computing a 40-byte random key to be used by a symmetric encryption algorithm like RC4:

Constant_String_"KEY" (3 bytes)+Random_Number (29 bytes)+DateTime_Timestamp (8 bytes)+ Access_Network_Id_PLMNID (3 bytes)

Of course, other arrangements for the key generated are possible, for instance if longer keys are required (128-byte or 256-byte long keys are recommended for RC4) or if the PLMN Id (Public Land and Mobile Network Identifier) is not available.

The OTT could know the structure of the key to verify the correct reception of the key when it is sent encrypted. This is however not required and it is not mandatory for the OTT server to recognize the structure of the key. If needed and for additional protection, the constant string ("KEY" in this example) could be enough for that purpose.

Theoretically each SSL/TLS TCP flow could have a unique random key but for the purposes of optimization (see later) a single key will be used by all flows and from all the subscribers going to the same OTT or OTT server.

The random key generated in this way will be used by the enricher E with a symmetric algorithm to encrypt the enriched variables and by the receiver R (OTT server) to decrypt the enriched variables.

In the following, mechanism for the distribution of random keys between the interacting nodes, i.e. the enricher E and receiver R, are described in more detail.

Figure 7:
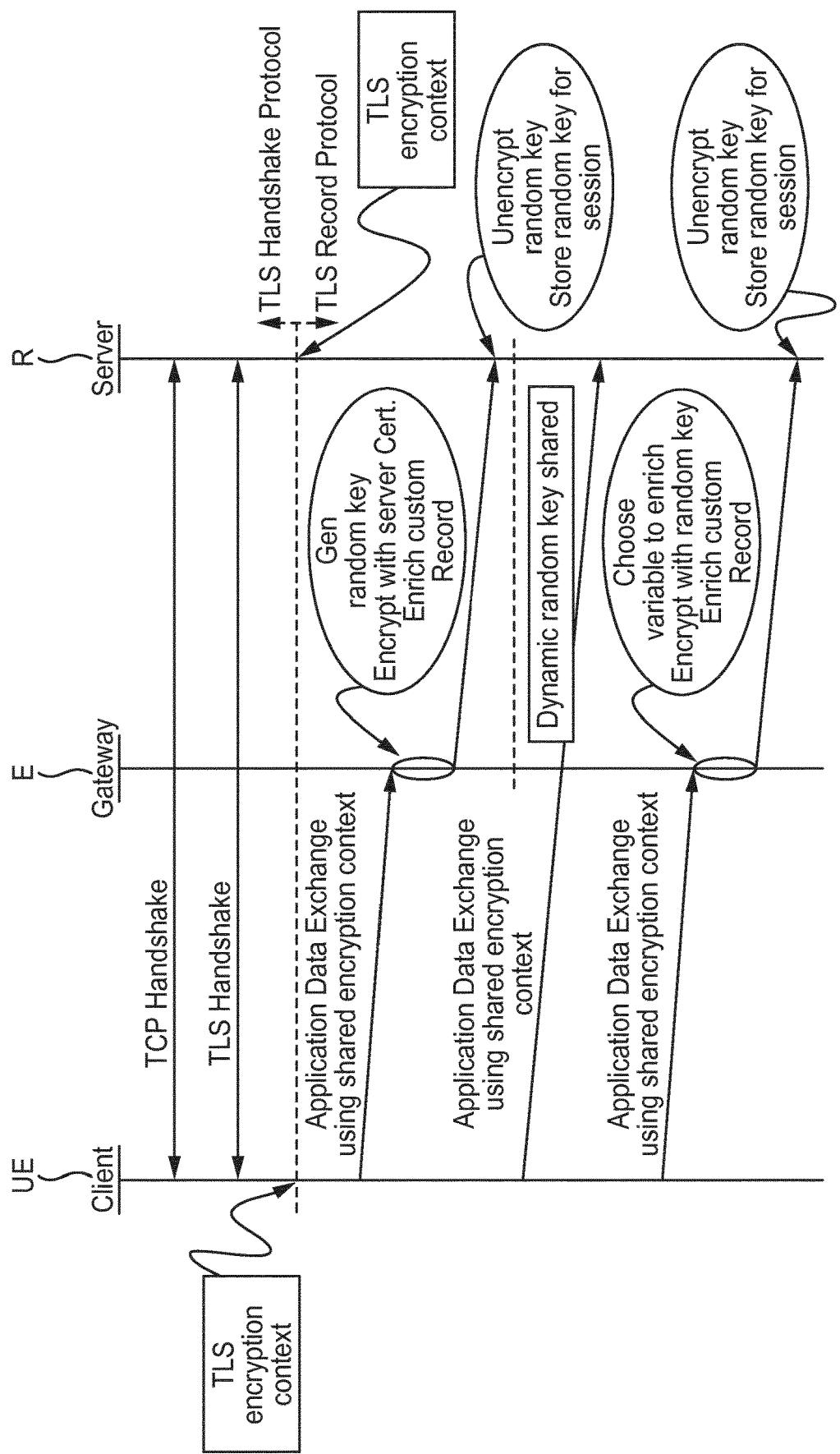
FIG. 7 shows random key exchange per flow according to an embodiment of the invention.

FIG. 7 shows the general mechanism for the exchange of the random keys generated in the enricher E (PCEF or TDF) to the receiver R of the enriched content (typically the OTT server).

The following steps are required:

The enricher E follows the TLS Handshake process using DPI techniques.

The enricher E identifies the Server Certificate message sent from the server R to the client UE and within that message, the server certificate which represents a public key which is used for asymmetric encryption (for example in X.509 format as a standard defining public key certificates).

The enricher E inspects, retrieves and stores the server certificate for the OTT server R, for instance by using DPI techniques.

Upon the completion of the TLS Handshake, the enricher E generates a random key following the instructions in the previous section.

The enricher E encrypts the random key thus generated with the public key of the server R extracted from the server certificate inspected in the previous steps.

The enricher E inserts a custom SSL/TLS record (a TLS-AUX record could also be used for this purpose) with the random key for the session encrypted with the server public key.

The TCP segment containing the original SSL/TLS record form the Client UE—used to convey the additional records—and the injected SSL/TLS record containing the encrypted random key is sent to the server R. For instance, one TCP segment can be sent with two SSL/TLS records but also two segments may be sent with one SSL/TLS record each.

The server R, upon reception of a custom SSL/TLS record or TLS-AUX record known to contain a key (type of record containing the key is known), tries to decrypt the contents with its private key. Optionally, if the format of the string matches the agreed format (for instance, the clear text version of the key starts with the string "KEY") accepts and stores the random key for the session. If no key format checks are included the keys are accepted blindly. Receivers R will usually receive the key per flow so there is no need for them to correlate keys across flows or to store keys per access network or subscriber. Only the receiver R holds the private key, so distributing the random key from the enricher E to the receiver R encrypted with the receiver's public key (derived from the inspection of the server certificate exchanged during the SSL/TLS handshake process) guarantees secure delivery of the random key.

If using SSL/TLS custom records, the custom SSL/TLS record used to convey the per flow random key can be identified via reserved values for the type, the mayor and the minor (standard fields for SSL/TLS Records). For instance, type 0xFF and mayor 0x00 and minor 0x01 can be used to identify records containing per flow random keys.

The mechanism above can be extended to convey additional information, namely:

Validity time: the time during which the random key will be valid can be conveyed via a custom SSL/TLS Record (if not embedded in the key format as per the previous section). Validity times can be used to age the keys, allowing for key update and rotation—increasing in this way the security of the solution. For instance, SSL/TLS records with type 0xFF and mayor 0x00 and minor 0x02 can be used for this purpose.

PLMN Id or Network identification (MCC/MNC) and node identification: for troubleshooting purpose the access network can identify itself towards the receiver R (OTT server), in case for instance the key format changes unexpectedly or there is any other problem like a node incorrectly configured. In this way, the receiver R can identify the faulty network or node and proceed to discuss the situation with the Access network administrators. For instance, type 0xFF and mayor 0x00 and minor 0x03 can be used for this purpose.

Figure 8:
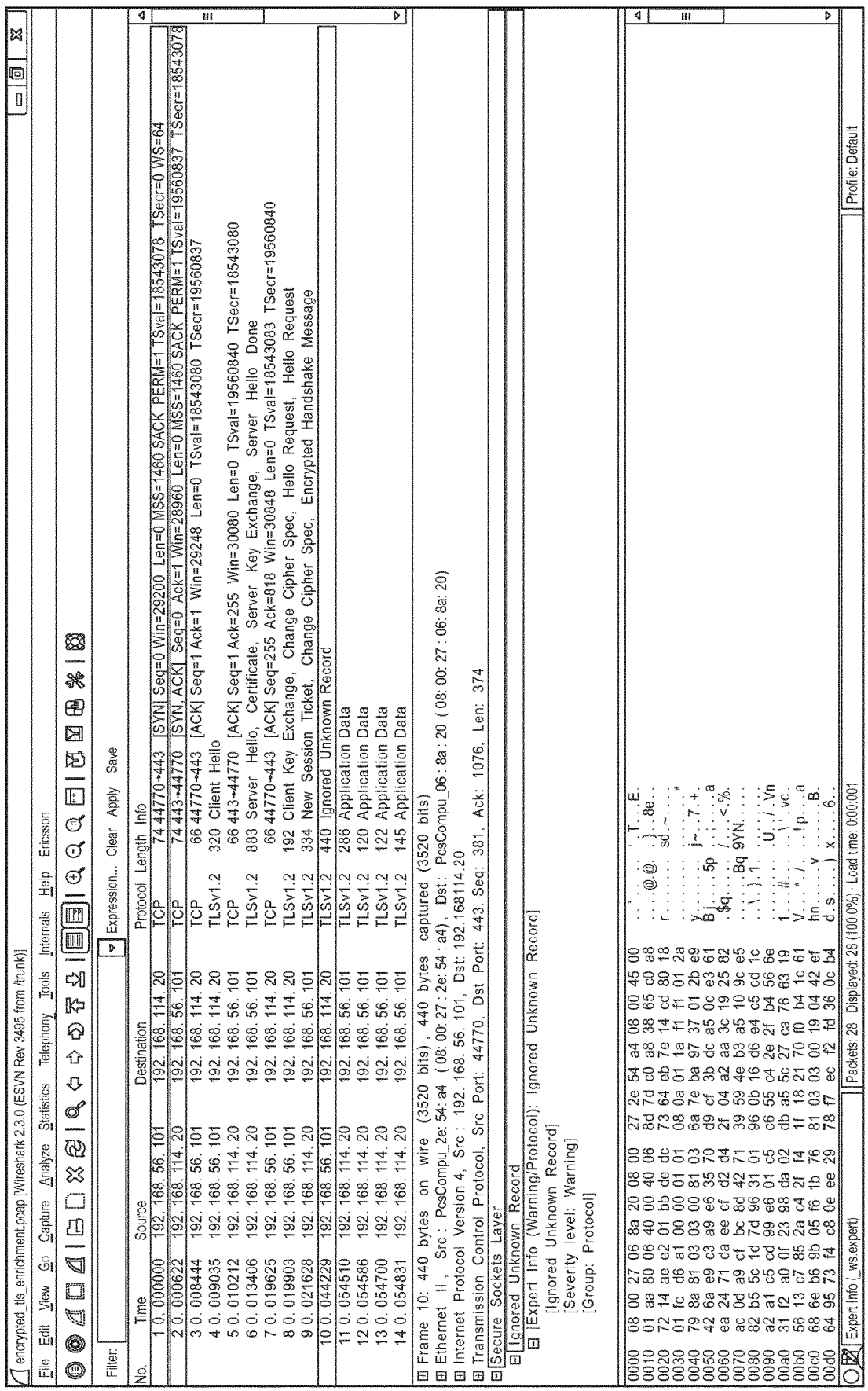
FIG. 8 shows an example for an exchanged random key per flow, encrypted with receiver's public key according to an embodiment of the invention.

FIG. 8 captures traffic, showing a basic per flow random key exchange implementation (since the key exchanged is encrypted with the receiver's R public key, there is no visibility of what information is being exchanged).

In the following, mechanism for the selection of the encryption algorithm used to secure enriched variables are explained in more detail.

The encryption algorithm used to encrypt the enriched variables must be agreed between the enricher E and the receiver R. Rather than using out of band mechanisms this invention proposes the usage of an additional custom SSL/TLS record with the algorithm name. Other mechanisms could be possible if for instance using TLS-AUX.

Type 0xFF and mayor 0x00 and minor 0x04 can be used for this purpose and this custom SSL/TLS Record can be sent at the same time the random keys are exchanged.

The algorithms to be included in this custom SSL/TLS record must be symmetric algorithms and must allow key sizes of the size of the random key being negotiated. The key size does not need to be explicitly specified as the length of the key exchanged represents the key size to use.

The algorithm names to be exchanged can be strings like "RC4" for Rivest Cipher 4 and "AES" for Advanced Encryption Standard. The random key length will specify if RC4-40 or RC4-256 is used (RC4 with 40-byte or 256-byte key size).

However, it is to be noted, that the dynamic selection and determination of the algorithm is a preferred, but only optional feature. In a simple embodiment, the algorithm may be pre-defined and pre-negotiated between the enricher E and the receiver R and thus, transfer to this algorithm information is not necessary. However, including this step helps to further increase security.

In the following, mechanism for Content Enrichment with encrypted variables using dynamic keys are explained in more detail.

Enrichment of variables over SSL/TLS can be implemented by injecting a string in a custom SSL/TLS Record. Any other mechanism for enrichment may be used, too. Type 0xFF and mayor 0x00 and minor 0x00 can be used for this purpose.

The advantage presented in this invention is that the string injected in the SSL/TLS record can now be encrypted with the symmetric algorithm notified to the receiver R and with the random key exchanged for the flow.

In this way, the invention presents a self-contained solution that can encrypt enriched variables without previous out of band arrangements—other than the receiver R knowing and implementing the required custom SSL/TLS or TLS-AUX Records—and that allows for automatic operation, for instance automatic key rotation and ageing.

The receiver R is adapted to execute the following steps:

Process the custom SSL/TLS records without failing the connection.

Extract the symmetric algorithm from the custom record containing that information.

Extract the encrypted key, decrypt it with the receiver's R private key and store it per flow (i.e. for the current flow).

Use the random key in clear to decrypt the encrypted variables being enriched and delivered—also in custom SSL/TLS records.

If the unencrypted subscriber payload is HTTP, enrich an HTTP header (X-header) with the clear text version of the enriched variable, implementing the complete use case in a secure way and transparent to the Layer 7 applications on the receiver R (like for instance a webserver).

It is assumed that both mechanisms can be used simultaneously (Content Enrichment of encrypted variables with dynamic keys and injection of X-headers in the SSL/TLS library implementation in the receiver R). Thus, a powerful and simple to operate use cases can be implemented. This has the technical advantage that security may be assured, irrespective of the underlying protocol used for payload communication (whether HTTP or SSL/TLS).

The generation of random keys per receiver R may be optimized, which will be explained below.

This refers to the optimization of the encryption of the random keys.

Since asymmetric algorithms are required (receiver R certificate contains a public key) and since asymmetric key operations are significantly more computationally expensive than symmetric ones, a major advantage of the present invention is to be seen in providing a computationally advantageous but nevertheless secure approach by only using asymmetric algorithms for key delivery while still using symmetric algorithms for variable encryption. SSL/TLS uses the same approach, with the "Encryption context" negotiated during the TLS Handshake phase using asymmetric algorithms and the TLS Record phase using symmetric encryption for performance.

Nevertheless, and since each SSL/TLS flow requires of a key and since each subscriber can generate several SSL/TLS flows and each enriching node E can support hundreds of thousands of subscribers, the computational and load impacts of random key encryption with asymmetric algorithms should be mitigated whenever possible.

Figure 9:
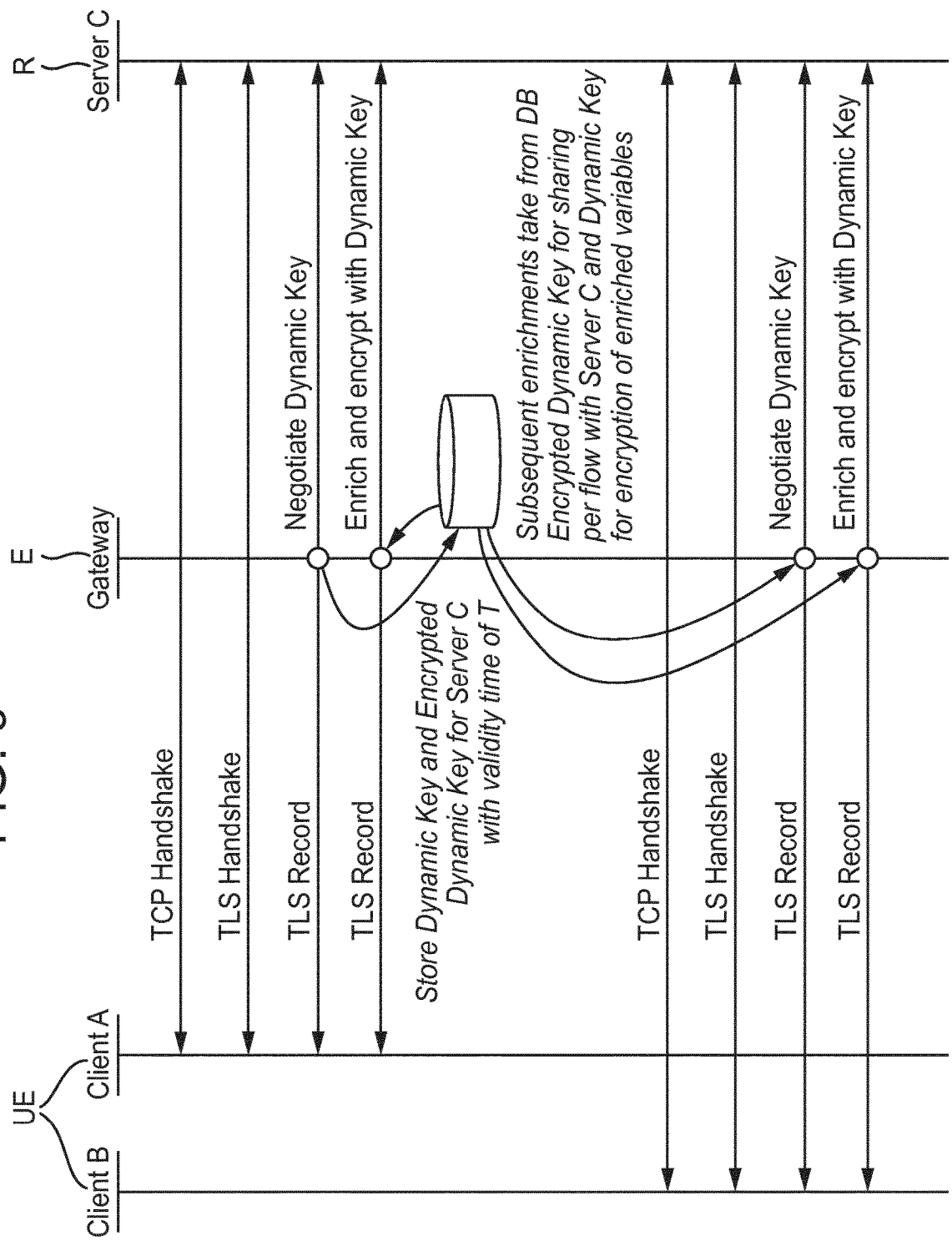
FIG. 9 shows storage of generated random keys (clear text and encrypted) and reuse across multiple SSL/TLS flows towards the same receiver according to an embodiment of the invention.

This invention proposes the use of a cache or database to store clear text random key and encrypted random key pairs per receiver R. That way, the encryption can be performed once per receiver R (for all flows and all subscribers) and the results can be stored. Subsequent flows to the same receiver R—across subscribers—can reuse the encrypted version of the key, saving resources. FIG. 9 depicts this scenario.

The following algorithm can be followed:

Using DPI techniques and when a SSL/TLS flow to be enriched has been identified, a query to a database is made to verify if a clear text—encrypted random key pair exists for the destination receiver R.

If no pair exists, a random key is generated and encrypted using the public key of the receiver R present in the certificate. The pair is stored in the database and indexed by a key representing the receiver R.

The encrypted version of the key is sent to the receiver R and the enrichment process continues.

Subsequent flows will follow the steps above and the encrypted version of the key will always be included for every flow that requires of content enrichment with encrypted variables using dynamic keys. Including the encrypted version of the random key in all flows has minimal cost—as the costly part is the encryption and this is not done for every flow—and allows for the receiver R simplification since no flow correlation will be required. All flows with encrypted variables will contain a copy of the required random key.

The validity time parameter can be used for key rotation (increased security) as described above. A validity time value can also be included in the database containing the encryption keys.

The entries in the database can be purged based on a validity time as explained above. In that case, the table to be stored in the said database could be as follows:

| IP address of receiver R (table key) | Validity Time | Clear Text random key | Encrypted random key |
|---|---|---|---|
| 101.102.103.104 | 2017 Jan. 1 | KEYAD86EF898 . . . (40 bytes) | 2398AB98 . . . (40 bytes) |

This application describes the following custom SSL/TLS records for the purposes of conveying the required information. Other equivalent mechanisms could also be used. The added records are summarized in FIG. 10.

It is to be noted that in the present application the term data packets are used without assigning the data segments to any protocol layer.

Finally, it has to be noted, that the mechanisms in this invention remove the need for the pre-sharing of encryption material (PSK), solving the inherent key distribution problem existing in the prior art. Moreover, with this invention, it is no longer necessary to pre-arrange and synchronize the algorithms between enricher E and receiver R, as it is necessary in state of the art systems.

While the current invention has been described in relation to its preferred embodiments, it is to be understood that this description is for illustrative purposes only. The enricher E and the receiver R may be included in cloud computing environments. Accordingly, it is intended that the invention be limited only by the scope of the claims appended hereto.

The invention claimed is:

1. A method for preparing an enriched variable for secure transfer via a transport layer protocol with subscriber payload data, wherein the method comprises:
   automatically and dynamically generating a random key;
   asymmetrically encrypting the generated random key;
   symmetrically encrypting the enriched variable with the generated random key;
   injecting a first custom record and a second custom record into a stream of the transport layer protocol, wherein:
      the first custom record is prepared with the encrypted generated random key,
      the second custom record is prepared with the encrypted enriched variable, and
      the first custom record and the second custom record are identical.

2. The method of claim 1, wherein the random key is generated dynamically for each data transfer associated with one of the following:
   a specific subscriber associated with one or more flows; or
   a particular flow associated with the specific subscriber.

3. The method of claim 1, wherein the random key is generated automatically in response to detection of subscriber traffic via deep packet inspection techniques (DPI).

4. The method of claim 1, wherein:
   the method further comprises determining a symmetric encryption algorithm for encrypting the enriched variable with the generated random key, wherein the symmetric encryption algorithm is determined dynamically per subscriber session; and
   an indication of the symmetric encryption algorithm is included in the first custom record or the second custom record.

5. The method of claim 1, wherein the first custom record or the second custom record comprises an indication how long the random key will be valid.

6. The method of claim 1, wherein:
   the first custom record or the second custom record includes an identification segment for troubleshooting; and
   the identification segment includes an identity associated with an access network in which the first custom record and the second custom record were prepared.

7. The method of claim 1, wherein:
   the method further comprises sending the stream with the injected custom records to a receiver; and the random key is asymmetrically encrypted with the receiver's private key according to the transport layer protocol.

8. The method of claim 1, wherein:
the stream of the transport layer protocol is an SSL/TLS record stream; and
the first custom record and the second custom record are injected in the stream of the transport layer protocol by a TLS-AUX mechanism.

9. The method of claim 1, wherein the transport layer protocol is one of the following: SSL/TLS, HTTP, POP3, or IMAP.

10. An access network node configured to prepare an enriched variable for secure transfer with subscriber payload data via a transport layer protocol, wherein the access network node comprises a processing unit configured to:
automatically and dynamically generate a random key;
asymmetrically encrypt the generated random key;
symmetrically encrypt the enriched variable with the generated random key;
inject a first custom record and a second custom record into a stream of the transport layer protocol, wherein:
the first custom record is prepared with the encrypted generated random key,
the second custom record is prepared with the encrypted enriched variable, and
the first custom record and the second custom record are identical.

11. The access network node of claim 10, wherein the access network node is operably coupled with a sending unit configured to send the stream with the injected custom records to a receiver.

12. The access network node of claim 10, wherein the access network node is one of the following: a policy control enforcement node (PCEF) or a traffic detection node (TDF).

13. A method for receiving a secured enriched variable with subscriber payload data via a transport layer protocol, the method comprising:
receiving a first custom record and a second custom record in a stream of the transport layer protocol, wherein:
the first custom record includes an encrypted random key,
the second custom record includes an encrypted enriched variable, and
the first custom record and the second custom record are identical;
extracting the encrypted random key;
decrypting the extracted encrypted random key; and
using the decrypted random key to decrypt the received encrypted enriched variable.

14. The method of claim 13, wherein the method is performed by one of the following: an over-the-top content (OTT) server, or a client device (UE).

15. The method of claim 13, wherein:
an indication of a symmetric encryption algorithm used to encrypt the enriched variable with the random key is included in the first custom record or the second custom record; and
the indicated symmetric encryption algorithm is used to decrypt the received encrypted enriched variable.

16. A receiver configured to receive a secured enriched variable with subscriber payload data via a transport layer protocol, the receiver comprising a processing unit configured to:
receive a first custom record and a second custom record in a stream of the transport layer protocol, wherein:
the first custom record includes an encrypted random key,
the second custom record includes an encrypted enriched variable, and
the first custom record and the second custom record are identical;
extract the encrypted random key;
decrypt the extracted encrypted random key; and
use the decrypted random key to decrypt the received encrypted enriched variable.

17. A method for secure transfer of enriched variables with subscriber payload data via a transport layer protocol, wherein the method comprises:
performing the following first operations by an access network:
automatically and dynamically generating a random key;
asymmetrically encrypting the generated random key;
symmetrically encrypting the enriched variable with the generated random key; and
injecting a first custom record and a second custom record into a stream of the transport layer protocol, wherein:
the first custom record is prepared with the encrypted generated random key, and
the second custom record is prepared with the encrypted enriched variable, and
the first custom record and the second custom record are identical;
and performing the following second operations by a receiver:
receiving the first custom record and the second custom record in the stream of the transport layer protocol;
extracting the encrypted random key;
decrypting the extracted encrypted random key; and
using the decrypted random key to decrypt the received encrypted enriched variable.

18. A non-transitory, computer-readable medium storing computer program code that, when executed by a processing unit of an access network function node, configures the access network function node to perform operations corresponding to the method of claim 1.

19. A non-transitory, computer-readable medium storing computer program code that, when executed by a processing unit of a receiver or a client device, configures the receiver or the client device to perform operations corresponding the method of claim 13.

* * * * *